Sept. 11, 1962 C. L. MUNSON 3,054,007
LIQUID COOLED EDDY CURRENT COUPLER DEVICE
Filed Aug. 12, 1958 3 Sheets-Sheet 1

INVENTOR.
Chester L. Munson
BY
Byron Hume Groen & Clement
ATTYS.

Sept. 11, 1962 C. L. MUNSON 3,054,007
LIQUID COOLED EDDY CURRENT COUPLER DEVICE
Filed Aug. 12, 1958 3 Sheets-Sheet 2

INVENTOR.
Chester L. Munson
BY
Byron Hume Groen & Clementi
ATTYS.

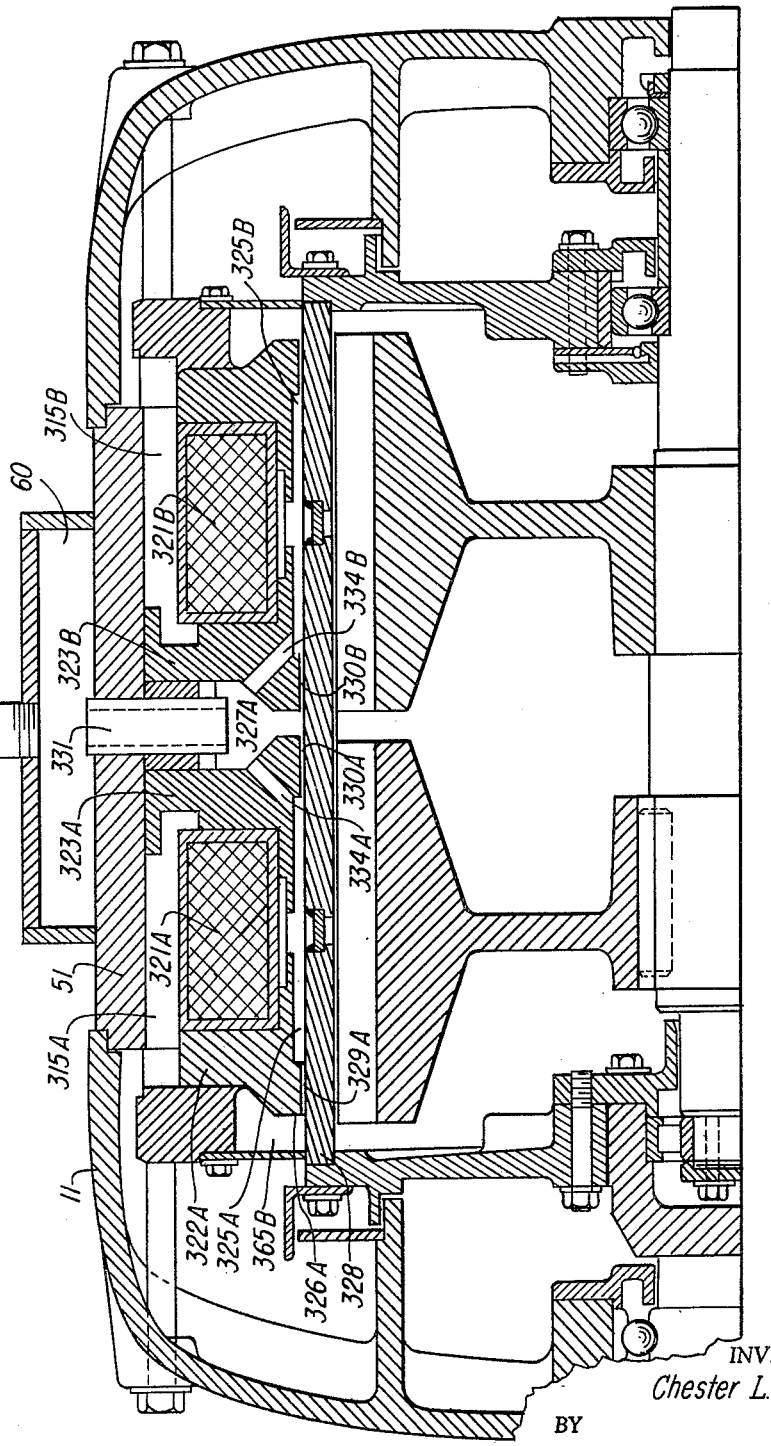

United States Patent Office 3,054,007
Patented Sept. 11, 1962

3,054,007
LIQUID COOLED EDDY CURRENT COUPLER
DEVICE
Chester L. Munson, Kenosha, Wis., assignor to The Louis Allis Co., Milwaukee, Wis., a corporation of Wisconsin
Filed Aug. 12, 1958, Ser. No. 754,624
8 Claims. (Cl. 310—105)

The present invention relates to liquid cooled eddy current coupler devices and particularly to structural arrangements for more effectively cooling such machines.

An eddy current coupler is a rotary machine made up essentially of a magnetic field member and an inductor member arranged to support an interlinking flux path, wherein at least one of the members is movable relative to the other. Due to the relative rotation of the magnetic field member and the inductor, magnetic flux is moved in the inductor causing eddy currents to be induced therein. These induced eddy currents develop a second magnetic field which produces a relative torque between the members, the strength of which is determined directly by the strength of the primary field and the speed differential between the two members. This difference in speed is known as slip. Generally, as the slip increases, more and stronger eddy currents are developed which in turn produce a greater relative torque between the field member and the inductor member. Dependent upon the type of pole arrangement employed in the field member, the torque-slip curve may exhibit a continuous tendency to rise or it may rise to a maximum and thereafter decrease with increasing slip.

This eddy current-torque characteristic is utilized in a clutch arrangement for controlling the torque applied to a drive; it is utilized in a brake arrangement for controlling the torque of a driven member; and it is utilized in a dynamometer arrangement for purposes of measuring the torque of a driven member.

A considerable amount of heat is developed in these couplers which corresponds to the slip power loss and one of the problems presented in the utilization of such equipment is the provision of means for adequately cooling the coupler. The problem is actually two-phased, that is, the heat must first be efficiently and effectively collected from the inductor drum and then carried from the coupler unit without adding substantially to the physical size or complexity of the unit. In a liquid cooled machine, the problem is further complicated by the fact that the flow of a large amount of liquid coolant onto a rotating inductor drum can effect a drag or a friction loss in the machine which considerably diminishes its efficiency.

It is a general object of the present invention to provide a new and improved liquid cooled eddy current coupler structure capable of efficiently and effectively collecting and carrying away from the coupler unit increased amounts of heat.

An additional object of the invention is to provide an improved structure for liquid cooled eddy current couplers for dissipating substantial amounts of heat from the unit with the use of but a small quantity of liquid coolant.

A further object of the invention is to provide an improved eddy current coupler unit of the liquid cooled type wherein liquid coolant is traversed axially across the surface of the inductor drum at a high velocity thereby to collect the heat generated therein without introducing any substantial energy loss.

Further objects and features of the invention pertain to the particular structure and arrangement whereby the above listed objects are achieved.

The invention, both as to its structure and mode of operation, will be better understood with reference to the following drawings wherein.

Figure 2:
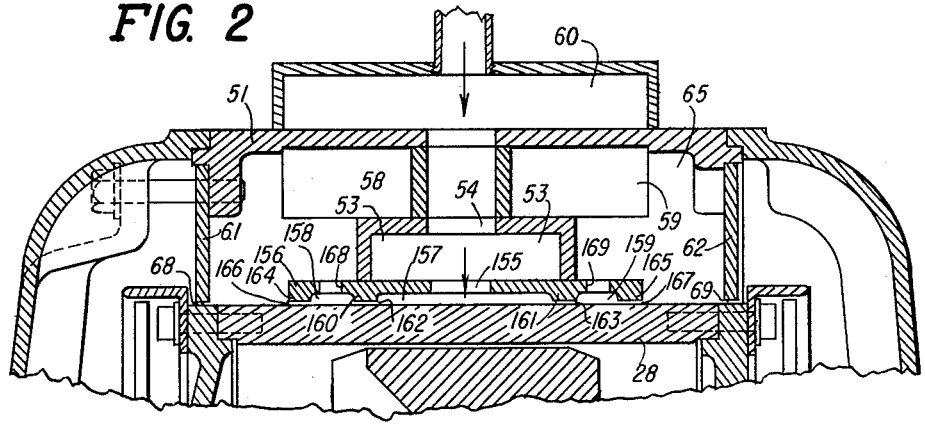
Figure 3:
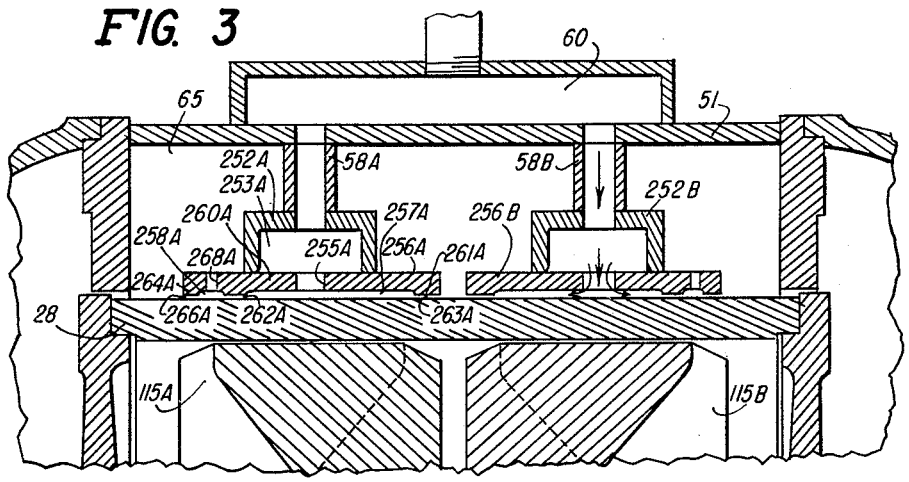
Figure 1A:
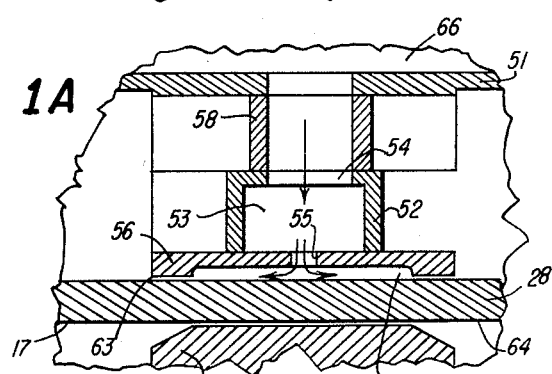
FIGURE 1A is an enlarged view of a portion of FIGURE 1.

FIGURES 2, 3 and 4 each are sectional views of a portion of other liquid cooled eddy current coupler structures incorporating the principles of the present invention.

Figure 1:
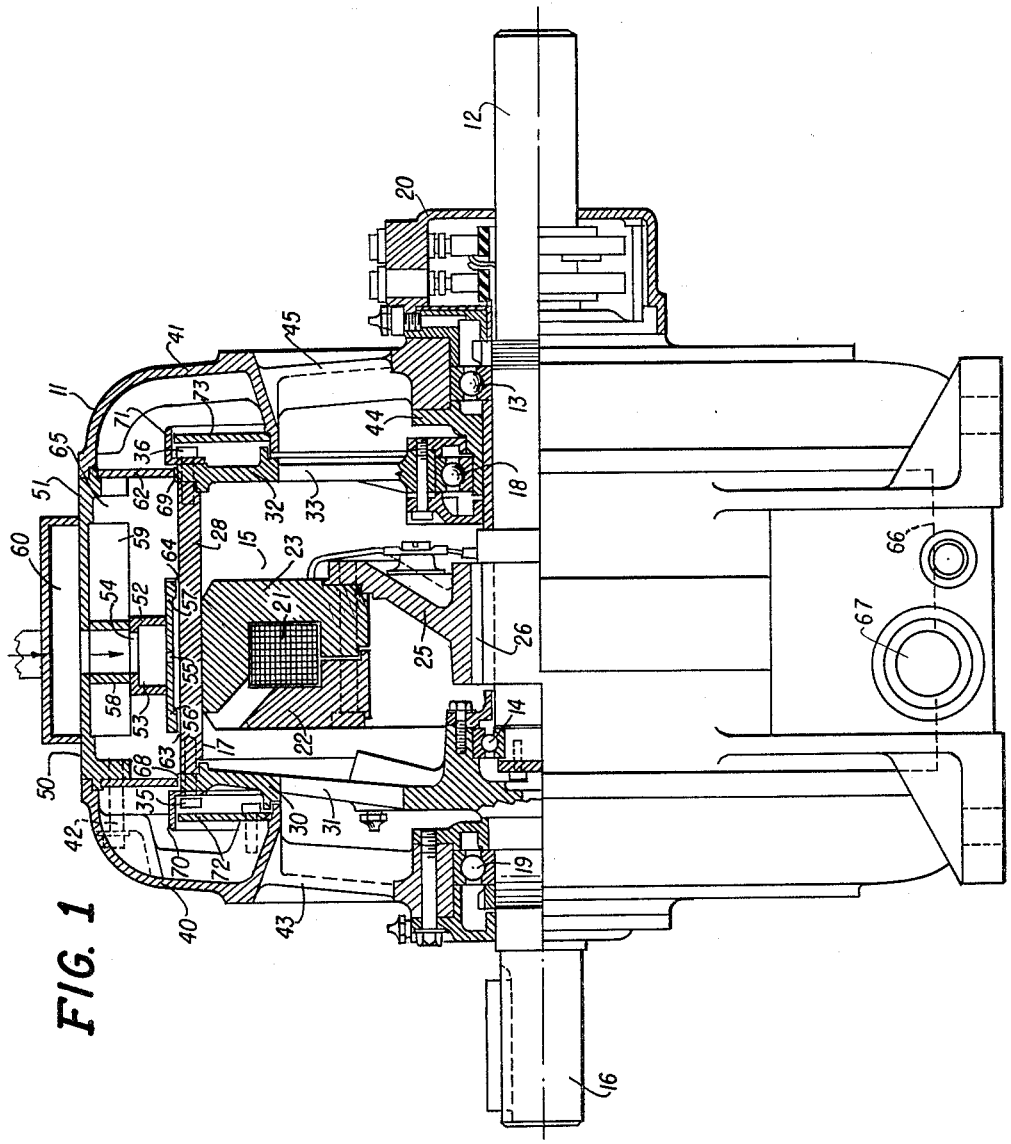
FIGURE 1 is a side view, partially in section, of an eddy current coupler device constructed in accordance with the principles of the present invention.

Referring now to the drawings, there is shown in FIGURE 1 an eddy current coupler device 10 of the clutch type including a casing 11, a driven shaft 12 carrying thereon a driven rotor 15 and supported on bearings 13 and 14, and a drive shaft 16 carrying on its end an eddy current rotor 17 and supported on bearings 18 and 19. Additionally, there is carried on the casing 11 in association with the driven shaft 12, a slip ring structure 20 by means of which electrical current is fed to the driven rotor 15.

The driven rotor 15 is the magnetic field member of a coupler device and is made up of an annular field coil 21 enclosed within a pair of intermeshing magnetic spiders 22 and 23. The rotor 15 is supported on a hub 25 which is joined directly to the shaft 12 between the bearings 13 and 14 for rotation therewith.

The eddy current rotor 17 is made up of a drum 28 of magnetic material, a spider 30 provided with openings 31 and a spider 32 provided with openings 33. The spider 30 is attached to one end of the drum 28 by means of bolts 35 and the spider 33 is attached to the other end of the drum 28 by means of bolts 36. The spider 30 serves as a driving head between the eddy current rotor 17 and the drive shaft 16 and is keyed or otherwise connected to the drive shaft 16 at its interior end. The spider 32 acts as a support for the other end of the drum and is rotatably carried on the bearings 18.

Casing 11 is made up of opposing end pieces 40 and 41 joined to a central annular unit 50 by means of bolts 42. The end piece 40 is provided with a central aperture in which the main bearing 19 is mounted and is provided with a plurality of axial apertures 43 for communicating air to the interior of the coupler device. The end piece 41 is provided with a central aperture in which the bearing 13 is supported and carries on its exterior face the slip ring arrangement 20 and on its interior face an internally projecting flange 44 upon which the bearing 18 is mounted. The end piece 41 is also provided with a plurality of axial openings 45 for communicating air to the interior of the coupler arrangement.

The central unit 50 of the casing 11 is made up of an annular casting 51 joining the end pieces 40 and 41 and supporting an interior manifold structure 52 from a plurality of ribs 59 spaced apart on the inner surface of the casting. The manifold 52 is made up of a chamber 53 having an inlet port 54 and a plurality of outlet ports 55. The wall of the chamber 53 in which the outlet ports 55 are disposed is an annular ring 56 which is closely spaced apart from the outer surface of the drum 28. In practice, the annular ring 56 may include a central groove or channel 57 on its surface opposite the face of the drum 28 with the rim portions thereof defining annular slots or slices 63 and 64 with the face of the drum 28.

The inlet port 54 to the annular chamber 53 communicates with a source of liquid coolant such as the supply box 60 through a pipe 58 extending through the casting 51.

The casting 51 also supports an annular ring 61 which is aligned with the web 30 and extends in close proximity thereto and spaced therefrom by the clearance 68. A similar annular ring 62 is supported from the casting 51 in alignment with the web 32 and extends in close proximity thereto and spaced therefrom by the clearance 69. The casting 51, the rings 61 and 62, and the drum 28 define a chamber 65 enclosing the manifold 52 and including at the bottom thereof a sump 66 provided with an outlet tap 67. The chamber 65 serves as a collector for the liquid coolant after it has performed its cooling operation and returns the same to the coolant reservoir.

To effect cooling of the inductor drum 28, a liquid coolant, such as water, is supplied from the box 60 under pressure through the pipe 58 to the annular chamber 53 wherein the coolant is distributed through the plurality of outlet ports 55 to the channel 57 formed in the annular ring 56. The volume of the channel 57 is filled with the liquid coolant under pressure which coolant is exhausted through the annular slices 63 and 64 between the ring 56 and the drum 28 into the chamber 65.

The liquid coolant is thus forced into close association with the heated drum 28 within the channel 57 thereby absorbing heat from the drum and in addition a very thin flow of water through the apertures 63 and 64 is placed into intimate contact with the drum 28 for purposes of further removing heat from the drum. The fluid flow through the apertures 63 and 64 under high pressure conditions also acts to scrub the surface of the drum thereby to remove from the surface thereof a stagnant film which ordinarily interferes with heat transmission away from the surface of the drum. Beyond the apertures 63 and 64, the coolant will continue to flow along the surface of the drum until finally it is centrifugally flung from the surface by the rotary motion of the drum. The heated liquid coolant falls to the bottom of the annular cavity 65 into the sump 66 wherein the coolant is drawn off through an outlet 67 and returned to the reservoir.

Inasmuch as there is no close seal between the annular rings 61 and 62 and the eddy current rotor 17, it is possible for fluid to escape from the chamber 65 through the clearances 68 and 69. To prevent such fluid from interfering with the field member or any of the support bearings, there is provided at both ends of the rotor 17 an outward extension from the webs 30 and 32, flanges 70 and 71, respectively, which overextend annular rings 72 and 73 which are a part of the end casing 40 and 41, respectively. The rings 72 and 73 form with the end pieces 40 and 41, respectively, annular chambers which extend down and communicate with the sump 66 in the bottom of the casing 11. In this arrangement, any spray or liquid coolant that may escape from the cavity 65 through the apertures 68 and 69 are flung by centrifugal motion of the rotor 17 from the flanges 70 and 71 and is collected in the cavity formed by the end casings 40 and 41 and the annular rings 72 and 73.

Though the major quantity of heat generated within the coupler unit is carried off by means of the liquid coolant, additional but lesser quantities of heat are still present within the unit and for efficient operation, it is desirable that this heat be removed. In order to effect the absorption of heat from the inner surface of the drum 28 and from the field member 15, air is circulated through the inner portions of the coupler unit between the axial cavities 43 and 45 in the end casings 40 and 41 of the unit. Specifically, exterior air may be communicated to the field member 15 and the interior surface of the drum 28 through the axial apertures 43 in the casing 40 and the axial apertures 31 in the web 30. Similarly, air can flow through the axial aperture 45 in the casing 41 and the aperture 33 in the web 32 of the rotor 17. A flow of air may be encouraged by use of fan blades strategically located on the rotating rotor 17 and additional current paths may be provided by apertures through the support head 25. In this manner effective cooling of the interior portions of the coupler unit is effected.

A variation of the arrangement shown in FIGURE 1 is illustrated in the structure of FIGURE 2. Therein the eddy current coupler structure is substantially identical to that shown in FIGURE 1, except that the annular ring 56 is made to be of a different form and configuration. Specifically, in FIGURE 2 there is shown with the manifold chamber 53 an annular ring 156 provided with a plurality of centrally located apertures 155 communicating with the manifold 53. The annular plate 156 includes therein a central channel 157 and side channels 158 and 159 disposed respectively on opposite sides of the channel 157 and separate therefrom by projections 160 and 161 which form with the outer surface of the drum 28 annular apertures or slices 162 and 163, respectively. The other walls of the channels 158 and 159 are defined by projections 164 and 165, respectively, which form annular apertures or slices 166 and 167 respectively, communicating with the chamber 65.

In communication between the channel 158 and the annual ring 156 and the chamber 65 is a plurality of apertures 168 and in communication between the channel 159 in the annular ring 156 and the chamber 65 is a plurality of apertures 169. In this arrangement, liquid coolant introduced into the manifold 53 is applied through the ports 55 to the central channel 157 and flows through the slices 162 and 163, respectively, into the channels 158 and 159. From the channels 158 and 159 a portion of the liquid coolant is exhausted through the slices 166 and 167, respectively, and another portion is exhausted through the apertures 168 and 169, respectively. The liquid coolant in the chamber 157 is in close association with the heated drum 28 whereby heat is absorbed from the drum and the thin flow of coolant through the apertures 162 and 163 is in intimate contact with the drum which causes scrubbing of the surface of the drum thereby to remove stagnant film and to absorb heat from the drum. In the channels 158 and 159, a portion of the coolant is in contact with the drum 28 and is exhausted through the slices 166 and 167, respectively. However, by virtue of the pressure applied to the coolant and the centrifugal motion of the drum 28, a substantial portion of the liquid coolant flowing into the channels 158 and 159 is discharged through the apertures 168 and 169, respectively. Thus, the apertures 168 and 169 operate as pressure relief ports and the velocity of the liquid coolant exhausted through the slices 166 and 167 is substantially decreased over that apparent in the arrangement of FIGURE 1. Accordingly, there is less tendency for the coolant to escape from the chamber 65 through the gaps 68 and 69.

FIGURE 3 shows a further variation of the arrangement shown in FIGURE 2 as applied to an eddy current coupler device provided with a pair of rotating field members 115A and 115B. In this arrangement there is provided a corresponding pair of liquid cooling manifolds 252A and 252B in communication with the supply box 60 through conduits 58A and 58B respectively. The manifold arrangements 252A and 252B are substantially identical in construction so that a detail description of one thereof will suffice as a detail description for both.

Considering the manifold 252A, the annular chamber 253A is closed on its side nearest the drum 28 by means of a plate 256A including therein a main channel 257A provided with a plurality of ports 255A. The channel 257A is bordered at one end thereof by a projection 261A which forms with the surface of the drum 28 a slice 263A which communicates with the chamber 65 and is bordered at the other end thereof by a projection 260A forming with the surface of the drum 28 a slice 262A in communication between the channel 257A and a secondary channel 258A. The channel 258A is provided with a plurality of radially disposed apertures 268A communicating with the chamber 65 and an annular projection 264A forming with the surface of the drum 28 a slice 266A in communication between the secondary channel 258A and the chamber 65.

In this arrangement, liquid coolant supplied from the supply box 60 is exhausted into the chamber 65 from the channel 257A through the slice 263A and through the slice 262A, the channel 258A, and the radial apertures 268A and the annular slice 266A.

FIGURE 4 is an illustration of the principles of the invention as applied to an eddy current coupler device provided with a pair of fixed annular field coils and a pair of concentrically located and rotatable inductor drums. Specifically, the arrangement includes field members 315A and 315B which are made to be integral with the casing 11 and which are substantially identical in structure so that the consideration of one field member will provide a description and consideration of both. The field member 315A includes an annular coil 321A which is supported from the casing 11 by webs 322A and 323A of magnetic material. The magnetic webs 322A and 323A form a channel 325A, bordered by annular projections 326A and 327A closely spaced apart from the inductor drum 328 thereby to define annular slices 329A and 330A, respectively.

In the arrangement shown, liquid coolant from a supply box 60 is fed into a conduit 331 into an annular manifold 332 defined by the magnetic webs 323A and 323B. The magnetic webs 323A and 323B also define an annular slot 333 which communicates directly with the surface of the inductor drum 328 and with the slices 330A and 330B associated respectively with the field members 315A and 315B. Additionally, the magnetic web 323A includes therein a plurality of apertures 334A communicating between the annular manifold 332 and the channel 325A.

In this arrangement, liquid coolant is supplied to the annular manifold 332 under pressure and distributed through the apertures 334A to the annular channel 325A and through the aperture 333 and the slice 330A to the annular channel 325A. A similar flow of liquid coolant to the annular channel 325B is experienced through the apertures 334B and the slice 330B. In the channel 325A, fluid is flowed in a thin film through the slice 326A into the annular chamber 365B wherein it is flung by centrifugal action from the inductor drum 28 and collected in a sump at the bottom of the eddy current coupler machine.

The important advantages of this cooling arrangement in accordance with the invention is that not only may a relatively small amount of coolant, such as water, be employed for purposes of absorbing and carrying off heat but most importantly it does so by forcing the coolant into close association with the surface of the heated drum and washing the coolant across the surface. This method of cooling heretofore has been avoided because this close contact between the heavy liquid and the rotating surface was thought to introduce dynamometer losses due to friction. Such losses are believed to be due in fact to sheering forces between the mass of a liquid and that thin volume of liquid immediately adjacent to the rotating member. In the present circumstance this disadvantage has been overcome by employing but a thin layer of coolant of a thickness corresponding to the "sheering depth" of the coolant and moving the coolant at a high velocity across the surface of the drum. The use of a thin film avoids the usual energy losses and the fast movement of the coolant permits the absorption of heat from the drum at a high rate. The inclusion in the arrangement of secondary channels for redirecting the flow of liquid coolant captures the coolant within the collection chamber and prevents a flow into other rotatable areas of the coupler unit.

Though the arrangements herein have been described in terms relative to eddy current clutch devices, it is understood that the principles are applicable to any type of liquid cooled eddy current coupler including the eddy current brake and the eddy current dynamometer. Though the arrangements described herein are at present considered to be preferred, it is understood that variations and modifications may be made therein and it is intended to cover in the appended claims all such variations and modifications as fall within the the true spirit and scope of the invention.

What is claimed is:

1. An eddy current coupler device comprising an inductor drum, a field member associated with said drum and providing an interlinking magnetic flux, said inductor drum and said field member being mounted for rotation relative to one another, means for concentrating the interlinking magnetic flux in said drum whereby relative movement between said drum and said field member is controlled and heat is generated in said drum, casing means enclosing said drum and said field member, an annular member supported in closely spaced relation from the outer surface of said inductor drum, and means for supplying to the space between said annular member and said inductor drum a liquid coolant under pressure thereby to force a thin layer of said liquid coolant axially along the outer surface of said drum.

2. An eddy current coupler comprising an inductor drum, a field member associated with said drum and providing an interlinking magnetic flux, said inductor drum and said field member being mounted for rotation relative to one another, means for concentrating the interlinking magnetic flux in said drum whereby relative movement between said drum and said field member is controlled and heat is generated in said drum, casing means enclosing the outer surface of said drum and including a sump in the bottom portion thereof, an annular member of a width less than that of said inductor drum supported in closely spaced relation from the outer surface of said inductor drum to form an annular chamber with the outer surface of said inductor drum and an annular slice on each side of said chamber between said member and said drum, and means for supplying liquid coolant to said annular chamber under pressure thereby to force a flow of coolant through said slices axially along the surface of said drum, whereby heat generated in said drum is carried away therefrom by the high velocity of flow of a thin layer of said coolant from said annular chamber along the outer surface of said drum to the sump in said casing.

3. An eddy current coupler device comprising a rotary inductor drum, a rotary field member within said drum providing an interlinking magnetic flux, means for concentrating the interlinking magnetic flux in said drum whereby relative movement between said drum and said field member is controlled and heat is generated in said drum, casing means enclosing the outer surface of said drum and including a sump in the bottom portion thereof, an annular member corresponding to said field member and supported from said casing in closely spaced relation from the outer surface of said inductor drum, said annular member being recessed in the central portion thereof to form an annular chamber with the outer surface of said inductor drum and to form an annular slice on each side of said chamber between said member and said drum, a manifold disposed on the outer face of said annular member, apertures in said annular member for communicating between said manifold and said annular chamber, and means for supplying liquid coolant to said manifold under pressure thereby to distribute said coolant in the annular chamber and flow said coolant through said slices axially along the surface of said drum, whereby heat generated in said drum is carried away therefrom by the high velocity of flow of thin layer of said coolant from said annular chamber along the outer surface of said drum to the sump in said casing.

4. An eddy current coupler device comprising a rotary inductor drum, a rotary field member within said drum providing an interlinking magnetic flux, means integral to said field member for concentrating the interlinking magnetic flux in said drum whereby relative movement between said drum and said field member is controlled and heat is generated in said drum, a casing enclosing said rotary drum and field member and including a sump in the bottom thereof, an annular member corresponding to said field member and supported from said casing in closely spaced relation from the outer surface of said inductor drum, said annular member being provided with a first annular recess and a second annular recess on the inner face of said member thereby to form a first annular chamber and a second annular chamber respectively with the outer surface of said inductor drum and a first slice communicating between said first and second chamber and a second slice communicating between said first chamber and the exterior of said annular member and a third slice communicating between said second chamber and the exterior of said annular member, a manifold disposed on the outer face of said annular member opposite said first chamber, first apertures in said annular member communicating between said manifold and said first chamber, second apertures in said annular member communicating between said second chamber and the exterior of said annular member, baffle means between said armature drum and said casing defining a closed cavity between said casing and said armature drum, and means for supplying liquid coolant to said manifold under pressure thereby to force said coolant into said first chamber and in flow through said first and second slices axially along the surface of said drum, said coolant in said second chamber being ejected into said cavity jointly from said second apertures and said third slice thereby deflecting at least a portion of said coolant toward said casing, and another portion toward said baffle means, whereby heat generated in said drum is carried away therefrom by the high velocity of flow of a thin layer of said coolant from said annular chamber along the outer surface of said drum to the sump in said casing.

5. An eddy current coupler device comprising a rotary inductor drum, a rotary field member within said drum providing an interlinking magnetic flux, means integral to said field member for concentrating the interlinking magnetic flux in said drum whereby relative movement between said drum and said field member is controlled and heat is generated in said drum, an annular member corresponding to and opposite said field member in closely spaced relation from the outer surface of said inductor drum, said annular member being provided with a first annular recess and being provided with a second annular recess and a third annular recess on opposite sides of said first recess, said recesses forming a first annular chamber and a second annular chamber and a third annular chamber, respectively, with the outer surface of said drum, a plurality of slices between said annular member and said armature drum communicating respectively between said first and second chambers and between said first and third chambers and between said second chamber and the exterior and between said third chamber and the exterior, a manifold disposed on the outer face of said annular member opposite said first chamber, first apertures in said annular member communicating between said manifold and said first chamber, second apertures in said annular member communicating between said second chamber and the exterior of said annular member, third apertures in said annular member communicating between said third chamber and the exterior of said annular member, a casing enclosing said rotary drum and field member and supporting said manifold and annular member, said casing being provided with a sump in the bottom thereof, baffle means between said inductor drum and said casing defining a closed cavity between said casing and said inductor drum, and means for supplying liquid coolant to said manifold under pressure thereby to force said coolant into said first chamber and in flow through said slices axially along the surface of said drum into said second and third chambers, said coolant in said second chamber and in said third chamber being ejected into said closed cavity jointly from the apertures and slices therein thereby deflecting a portion of said coolant toward said casing and another portion toward said baffle means, whereby heat generated in said drum is carried away therefrom by the high velocity of flow of a thin layer of said coolant from said annular chamber along the outer surface of said drum to the sump in said casing.

6. An eddy current coupler device comprising a rotary inductor drum, an annular field member positioned exterior to said drum in close proximity to the outer surface thereof and providing an interlinking magnetic flux, rotor means interior to said drum for concentrating the interlinking magnetic flux in said drum whereby relative movement between said drum and said field member is controlled and heat is generated in said drum, said field member being recessed in the central portion thereof to form with the outer surface of said inductor drum an annular chamber and an annular slice on each side of said chamber between said member and said drum, and means for supplying liquid coolant to said annular chamber under pressure thereby to force a flow of coolant through said slices axially along the surface of said drum, whereby heat generated in said drum is carried away therefrom by the high velocity of flow of a thin layer of said coolant from said annular chamber along the outer surface of said drum.

7. An eddy current coupler device comprising a rotary inductor drum, an annular field member positioned exterior to said drum in close proximity to the outer surface thereof and providing an interlinking magnetic flux, rotor means interior to said drum for concentrating the interlinking magnetic flux in said drum whereby relative movement between said drum and said field member is controlled and heat is generated in said drum, said field member being recessed in the central portion thereof to form with the outer surface of said inductor drum an annular chamber and an annular slice on each side of said chamber between said member and said drum, a casing enclosing said field member and said inductor drum and including a sump in the bottom portion thereof, baffle means carried by said casing and said inductor drum defining a closed cavity with said field member and said inductor drum and communicating with said sump, a manifold communicating with said annular chamber, and means for supplying liquid coolant to said manifold under pressure thereby to distribute said coolant in said annular chamber and flow said coolant through said slices axially along the surface of said drum, whereby heat generated in said drum is carired away therefrom by the high velocity of flow of a thin layer of said coolant from said annular chamber along the outer surface of said drum to the sump in said casing.

8. An eddy current coupler device comprising a rotary inductor drum, a pair of annular field members coaxially aligned exterior to said drum in close proximity to the outer surface thereof and providing interlinking magnetic flux therewith, means interior to said drum for concentrating the interlinking magnetic flux in said drum whereby relative movement between said drum and said field members is controlled and heat is generated in said drum, each of said field members being recessed in the central portion thereof to form with the outer surface of said inductor drum an annular chamber and an annular slice on each side of said chamber between said member and said drum, a casing carrying said field members and said inductor drum and including a sump in the bottom portion thereof, baffle means at each end of said drum carried between the end of said inductor drum and the adjacent field member defining a closed cavity with said field members and said inductor drum and communicating with said sump, a manifold positioned between said field members, a first aperture communicating between said manifold and said inductor drum and adjacent ones of said slices, second apertures communicating between said manifold and said annular chambers, and means for supplying liquid coolant to said manifold under pressure thereby to distribute said coolant into each annular chamber through said second apertures and to flow said coolant through said slices from said first aperture and into said annular chambers and axially along the surface of said drum, whereby heat generated in said drum is carried away therefrom by the high velocity of flow of a thin layer of said coolant from said annular chamber along the outer surface of said drum to the sump in said casing.

References Cited in the file of this patent

UNITED STATES PATENTS

| | | |
|---|---|---|
| 2,367,636 | Winther | Jan. 16, 1945 |
| 2,376,441 | Martin | May 22, 1945 |
| 2,428,634 | Nordstrum | Oct. 7, 1947 |
| 2,462,451 | Winther | Feb. 22, 1949 |
| 2,521,535 | Potts | Sept. 5, 1950 |
| 2,864,015 | King | Dec. 9, 1958 |